United States Patent
Aoki et al.

(10) Patent No.: US 11,659,147 B2
(45) Date of Patent: May 23, 2023

(54) LIQUID CRYSTAL PROJECTOR AND METHOD FOR CONTROLLING LIQUID CRYSTAL PROJECTOR

(71) Applicant: SEIKO EPSON CORPORATION, Tokyo (JP)

(72) Inventors: Toru Aoki, Shiojiri (JP); Shinichi Wakabayashi, Suwa (JP); Masatoshi Ito, Matsumoto (JP); Daigo Hokazono, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/527,613

(22) Filed: Nov. 16, 2021

(65) Prior Publication Data

US 2022/0159224 A1 May 19, 2022

(30) Foreign Application Priority Data

Nov. 17, 2020 (JP) ............................. JP2020-190759

(51) Int. Cl.
*H04N 9/31* (2006.01)
*G02F 1/13* (2006.01)

(52) U.S. Cl.
CPC ........... *H04N 9/315* (2013.01); *G02F 1/1313* (2013.01); *H04N 9/3111* (2013.01)

(58) Field of Classification Search
CPC .. G03B 21/006; G03B 21/142; G03B 21/206; G03B 21/208; G03B 21/2053; H04N 9/315; H04N 9/3105; H04N 9/3111; H04N 9/3182; H04N 9/3194; G02F 1/133; G02F 1/1313; G02F 1/1326; G02F 1/13318; G02F 1/13382
See application file for complete search history.

(56) References Cited

U.S. PATENT DOCUMENTS

| | | | |
|---|---|---|---|
| 6,930,667 B1* | 8/2005 | Iijima | G09G 3/3622 345/204 |
| 2008/0191995 A1* | 8/2008 | Cheon | G09G 3/20 345/87 |
| 2009/0285564 A1 | 11/2009 | Kato et al. | |
| 2013/0070208 A1* | 3/2013 | Nakanishi | G03B 21/16 353/31 |
| 2014/0028986 A1* | 1/2014 | Plut | G03B 21/142 353/121 |
| 2016/0363841 A1 | 12/2016 | Hino et al. | |
| 2016/0366383 A1 | 12/2016 | Nishimori et al. | |

(Continued)

FOREIGN PATENT DOCUMENTS

| | | |
|---|---|---|
| JP | H04-063332 A | 2/1992 |
| JP | 2003-262893 A | 9/2003 |
| JP | 2005-091519 A | 4/2005 |

(Continued)

*Primary Examiner* — Sultan Chowdhury
(74) *Attorney, Agent, or Firm* — Oliff PLC

(57) ABSTRACT

A liquid crystal projector includes a liquid crystal panel configured to generate a modulated image, a sensor configured to detect a temperature of the liquid crystal panel, an optical shift element configured to shift an emission optical path of the modulated image generated by the liquid crystal panel, and a control circuit configured to control a velocity of a shift in the optical shift element according to the temperature detected by the sensor.

4 Claims, 8 Drawing Sheets

(56) References Cited

U.S. PATENT DOCUMENTS

2018/0095269 A1    4/2018  Mizoguchi et al.
2018/0240423 A1*  8/2018  Park .................... G09G 3/3607

FOREIGN PATENT DOCUMENTS

| JP | 2008-022475 A | 1/2008 |
| JP | 2017-003741 A | 1/2017 |
| JP | 2017-003926 A | 1/2017 |
| JP | 2018-054974 A | 4/2018 |
| JP | 2018-128486 A | 8/2018 |

\* cited by examiner

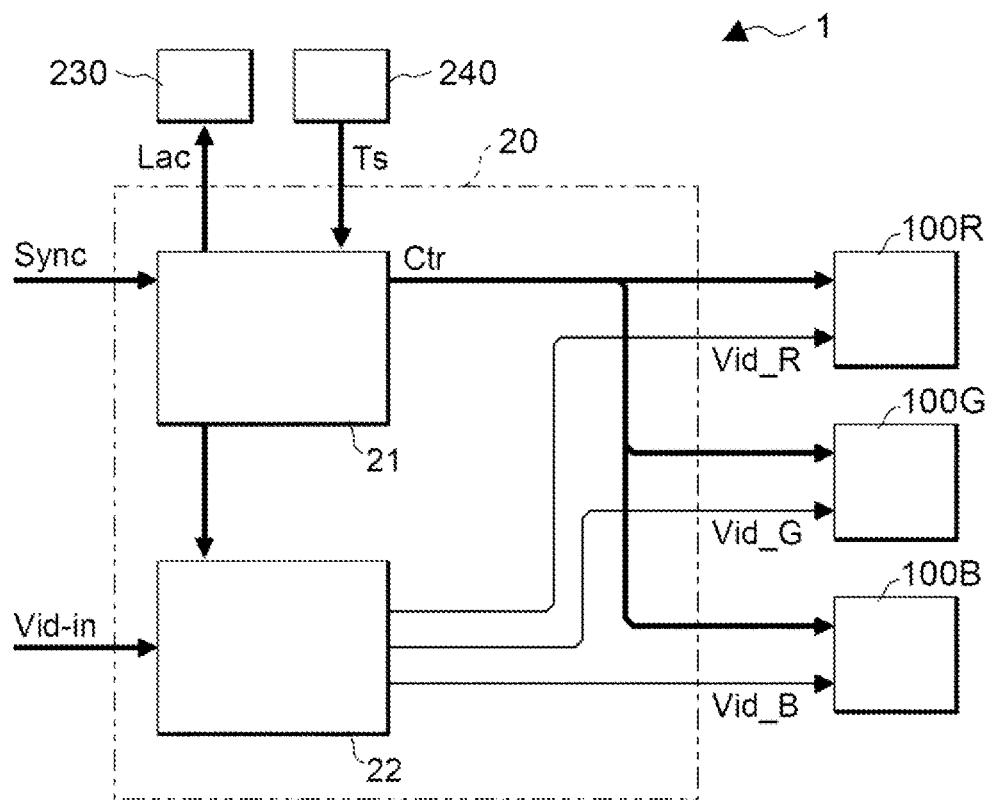
FIG. 2
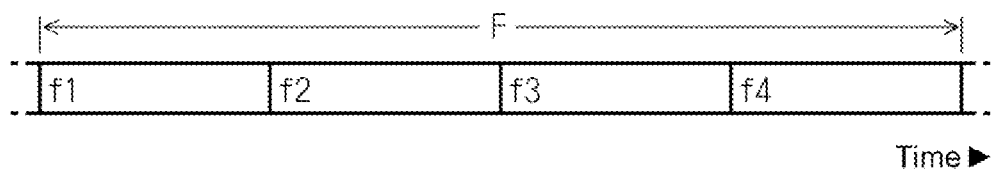
FIG. 3
FIG. 4

FIG. 5

LIQUID CRYSTAL PROJECTOR AND METHOD FOR CONTROLLING LIQUID CRYSTAL PROJECTOR

The present application is based on, and claims priority from JP Application Serial Number 2020-190759, filed Nov. 17, 2020, the disclosure of which is hereby incorporated by reference herein in its entirety.

BACKGROUND

1. Technical Field

The present disclosure relates to a liquid crystal projector and a method for controlling the liquid crystal projector.

2. Related Art

In a liquid crystal projector, in order to artificially increase the resolution of an image, technique for shifting the position of a pixel projected on a screen or the like by a shift device is known (see, for example, JP-A-4-063332). This technique allows the user to visually recognize as if the resolution higher than the resolution of the liquid crystal panel is projected. The shift device is an optical shift element and is also called an optical axis shift element.

In the technique for shifting the position of the pixel projected by the optical shift element, when the image is not displayed during the shifting period, the brightness of the image decreases. Therefore, during the shifting period, technique for displaying an image for the movement period has been proposed (for example, JP A 2018-128486).

However, it has been pointed out that in the technique for displaying the image for the movement period during the shifting period, the quality of the projected image deteriorates when a usage condition of the liquid crystal projector changes.

SUMMARY

In order to solve the above-described issue, a liquid crystal projector according to an aspect of the present disclosure includes a liquid crystal panel configured to generate a modulated image, a sensor configured to detect a temperature of the liquid crystal panel, an optical shift element configured to shift an emission optical path of the modulated image generated by the liquid crystal panel, and a control circuit configured to control a velocity of a shift in the optical shift element according to the temperature detected by the sensor.

BRIEF DESCRIPTION OF THE DRAWINGS

FIG. 2 is a block diagram illustrating an electrical configuration of the liquid crystal projector.

FIG. 3 is a diagram illustrating the relationship between a frame and a subframe.

FIG. 4 is a diagram illustrating the relationship between a display pixel and a panel pixel, and the like.

FIG. 5 is a diagram illustrating the relationship between the display pixel expressed by the panel pixel and a projection position.

DESCRIPTION OF EXEMPLARY EMBODIMENTS

An exemplary embodiment will be described below with reference to the accompanying figures. In each figure, a size and a scale of each unit is different from the actual size and the actual scale of each unit as appropriate. Further, the embodiment described below is suitable specific example, and thus various technically preferred limitations are given. Therefore, the scope of the disclosure is not limited to these embodiments unless otherwise stated to limit the disclosure in the following descriptions.

Figure 1:
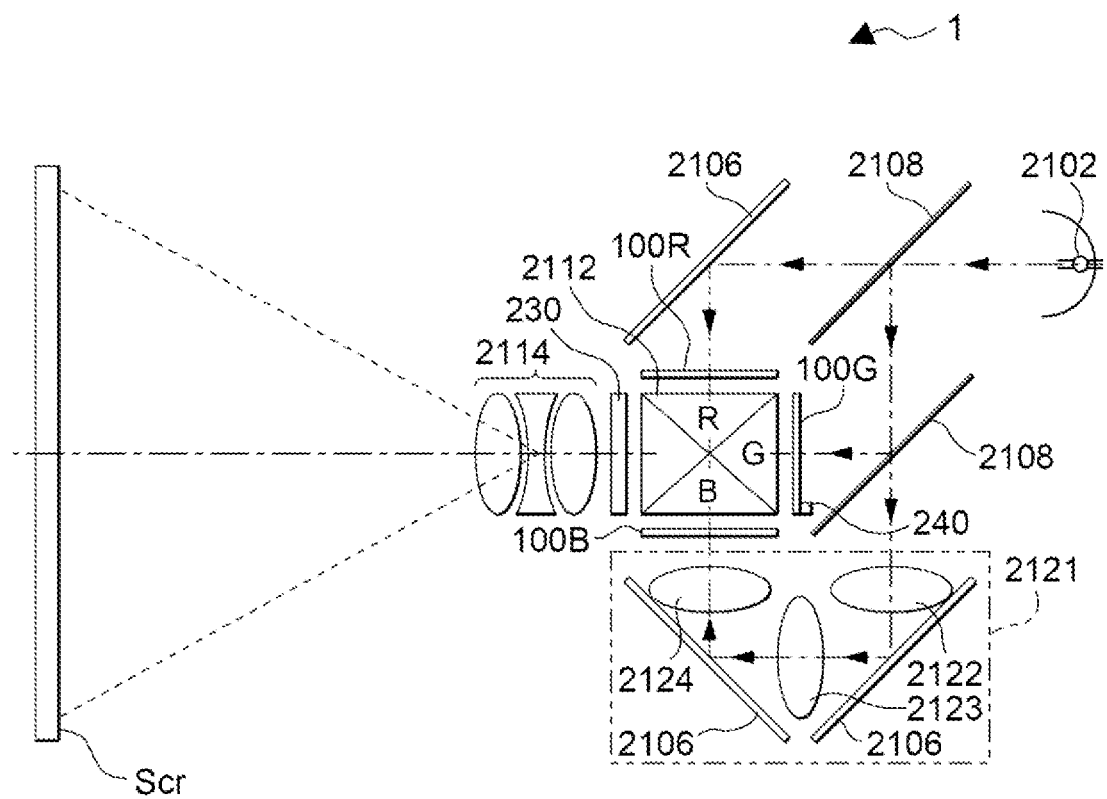
FIG. 1 is a diagram illustrating an optical configuration of a liquid crystal projector according to an exemplary embodiment.

FIG. 1 is a diagram illustrating an optical configuration of a liquid crystal projector 1 according to the exemplary embodiment. FIG. 1 also illustrates a screen Scr on which an image is projected, the left-right direction of a projection surface of the screen Scr is the front side direction or the depth direction of the paper, and the up-down direction of the projection surface is the vertical direction of the paper. As illustrated, the liquid crystal projector 1 is a three-plate type including liquid crystal panels 100R, 100G, and 100B. A lamp unit 2102 including a white light source such as a halogen lamp is provided inside the liquid crystal projector 1. Light emitted from the lamp unit 2102 is split into three primary colors of red (R), green (G), and blue (B) by three mirrors 2106 and two dichroic mirrors 2108 installed inside. Of the light of the primary colors, the light of R, the light of G, and the light of B are incident on the liquid crystal panel 100R, the liquid crystal panel 100G, and the liquid crystal panel 100B, respectively. Further, the lamp unit 2102 may include an LD light source, an LED light source, and a fluorescent light emitter, and may emit white light. The light of R, the light of G, and the light of B correspond to red color light, green color light, and blue color light, respectively, and as is well known, the wavelength of blue color light is shorter than the wavelength of green color light, and the wavelength of green color light is shorter than the wavelength of red color light.

Note that an optical path of B is longer than those of other R and G. Thus, the light of B is guided to the liquid crystal panel 100B via a relay lens system 2121 constituted by an incidence lens 2122, a relay lens 2123, and an emission lens 2124 in order to prevent a loss due to the optical path.

The liquid crystal panel 100R includes pixel circuits arranged in a matrix as described later. The transmittance of light emitted from a liquid crystal element included in the pixel circuit is controlled based on a data signal corresponding to R. That is, in the liquid crystal panel 100R, the light emitted from the liquid crystal element functions as a minimum unit of the image. By such control, the liquid crystal panel 100R generates a modulated image (transmission image) of R based on the data signal corresponding to R. Similarly, the liquid crystal panel 100G generates a modulated image of G based on the data signal corresponding to G, and the liquid crystal panel 100B generates a modulated image of B based on the data signal corresponding to B. The modulated image of R, the modulated image of G, and the modulated image of B correspond to a first modulated image, a second modulated image, and a third modulated image, respectively.

The liquid crystal panel 100G is provided with a sensor 240 configured to detect a usage condition. In the present embodiment, the sensor 240 detects the temperature of the liquid crystal panel 100G and outputs the temperature as a detection signal Ts.

The modulated images of each color generated by each of the liquid crystal panels 100R, 100G, and 100B are incident on a dichroic prism 2112 from three directions. Then, at the dichroic prism 2112, the light of R and the light of B are refracted at 90 degrees, whereas the light of G travels in a straight line. Accordingly, the dichroic prism 2112 synthesizes the modulated images of each color. The modulated image that is synthesized by the dichroic prism 2112 is incident on a projection lens 2114 via an optical shift element 230. The optical shift element 230 shifts an emission optical path from the dichroic prism 2112. Specifically, the optical shift element 230 is configured to shift the image projected on the screen Scr in the left-right direction and the up-down direction on the projection surface. The left-right direction and the up-down direction respectively correspond to the horizontal direction and the vertical direction of the liquid crystal panels 100R, 100G, and 100B. The projection lens 2114 magnifies and projects the synthesized image that has passed sequentially through the optical shift element 230 and the projection lens 2114, on the screen Scr.

For convenience of explanation, in order to distinguish between a pixel projected on the screen Scr and pixels of the liquid crystal panels 100R, 100G and 100B, the pixel projected on the screen Scr are referred to as a projection pixel, and the pixels of liquid crystal panels 100R, 100G and 100B are referred to as panel pixels. Further, the position of the projection pixel via the optical shift element 230 is simply referred to as a projection position.

Note that while the modulated image by each of the liquid crystal panels 100R and 100B is projected after being reflected by the dichroic prism 2112, the modulated image by the liquid crystal panel 100G travels straightly in the dichroic prism 2112 and is projected. Thus, the modulated image of each of the liquid crystal panels 100R and 100B has a left-right inverted relationship with respect to the modulated image of the liquid crystal panel 100G.

FIG. 2 is a block diagram illustrating an electrical configuration of the liquid crystal projector 1. As illustrated, the liquid crystal projector 1 includes a control circuit 20 in addition to the liquid crystal panels 100R, 100G, and 100B, the optical shift element 230, and the sensor 240 described above.

The control circuit 20 is to be supplied with video data Vid-in from an upper device such as a host device (not illustrated) in synchronization with a synchronizing signal Sync. The video data Vid-in is data indicating an image to be displayed on the liquid crystal projector 1, and specifically, specifies a gray scale level in the pixel of the image, for example, by 8 bits for each RGB. For convenience of explanation, the pixel of the image indicated by the video data Vid-in is referred to as a display pixel.

The synchronizing signal Sync includes a vertical synchronizing signal instructing the start of the vertical scanning in the video data Vid-in, a horizontal synchronizing signal instructing the start of the horizontal scanning, and a clock signal indicating a timing of one pixel of the video data Vid-in.

In the present embodiment, a color image projected on the screen Scr is expressed by synthesizing the modulated images of each of the liquid crystal panels 100R, 100G, and 100B. Therefore, the pixel which is the minimum unit of the color image can be divided into a red panel pixel by the liquid crystal panel 100R, a green panel pixel by the liquid crystal panel 100G, and a blue panel pixel by the liquid crystal panel 100B. To be exact, the red panel pixel, the green panel pixel, and the blue panel pixel should be described as sub-pixels, but in the present description, they are described as the panel pixels as described above.

The liquid crystal panels 100R, 100G and 100G differ only in the color of the incident light, that is, the wavelength, and the basic structures thereof are common. Therefore, when it is not necessary to specify the color to explain the liquid crystal panels 100R, 100G, and 100G, the reference numeral is denoted by 100.

The control circuit 20 includes a display control circuit 21 and a video processing circuit 22.

In the present embodiment, the arrangement of the display pixels specified by the video data Vid-in is, for example, twice in the vertical direction and twice in the horizontal direction as compared with the arrangement of the panel pixels in the liquid crystal panel 100. In this case, the video data Vid-in including information having four times resolution of that of the liquid crystal panel 100 is input from the upper device.

Therefore, in the present embodiment, the projection position is shifted by the optical shift element 230 in order to cause the projection pixel to be visually recognized at a resolution higher than the resolution of the panel pixel. Specifically, when an image of one frame is displayed by the video data Vid, a period for displaying the one frame is set to four subframes, and the projection position is shifted for each subframe. By such a shift, one panel pixel is visually recognized as if four display pixels are displayed in one frame (four subframes).

Prior to the description of the display control circuit 21 and the video processing circuit 22, a specific method for expressing four display pixels specified by the video data Vid-in by one panel pixel of the liquid crystal panel 100 will be described.

FIG. 3 is a diagram illustrating the relationship between the frame and the subframe according to the present embodiment. As illustrated in this figure, in the present embodiment, one frame F is divided into four subframes. In order to conveniently distinguish the four subframes in the frame F, the reference numerals are given as f1, f2, f3, and f4 in the order of time.

The period length of the frame F is 16.7 milliseconds of one cycle when the frequency of the vertical synchronizing signal included in the synchronizing signal Sync is 60 Hz. In this case, the period lengths of the subframes f1 to f4 are 4.17 milliseconds, respectively.

Next, the relationship between the display pixel whose gray scale level is specified by the video data Vid-in, the panel pixel by the liquid crystal panel 100, and the projection position by the optical shift element 230 will be described. The optical shift element 230 shifts the projection direction from the dichroic prism 2112 as described above, but for convenience, the shift amount is converted into the size of the projection pixel (panel pixel) on the screen Scr.

The left column in FIG. 4 is a diagram that extracts and illustrates only a part of the display image indicated by the video data Vid. Further, the right column in FIG. 4 is a diagram that extracts and illustrates an arrangement corresponding to the arrangement of the display pixels in the left column of the panel pixels.

In the arrangement of the display pixels of the video data Vid in FIG. 4, in order to distinguish the pixels, for convenience, as reference numerals, A1 to A6 are given to the first row, B1 to B6 are given to the second row, C1 to C6 are given to the third row, D1 to D6 are given to the fourth row, E1 to E6 are given to the fifth row, and F1 to F6 are given to the sixth row, respectively.

In the arrangement of the panel pixels in FIG. 4, in order to distinguish the pixels, for convenience, as reference numerals, a1 to a3 are given to the first row, b1 to b3 are given to the second row, and c1 to c3 are given to the third row, respectively. FIG. 4 illustrates that, in the arrangement of the display pixels indicated by the video data Vid, a total of four display pixels of 2×2 illustrated by a thick line frame can be expressed by one panel pixel.

Figure 5:
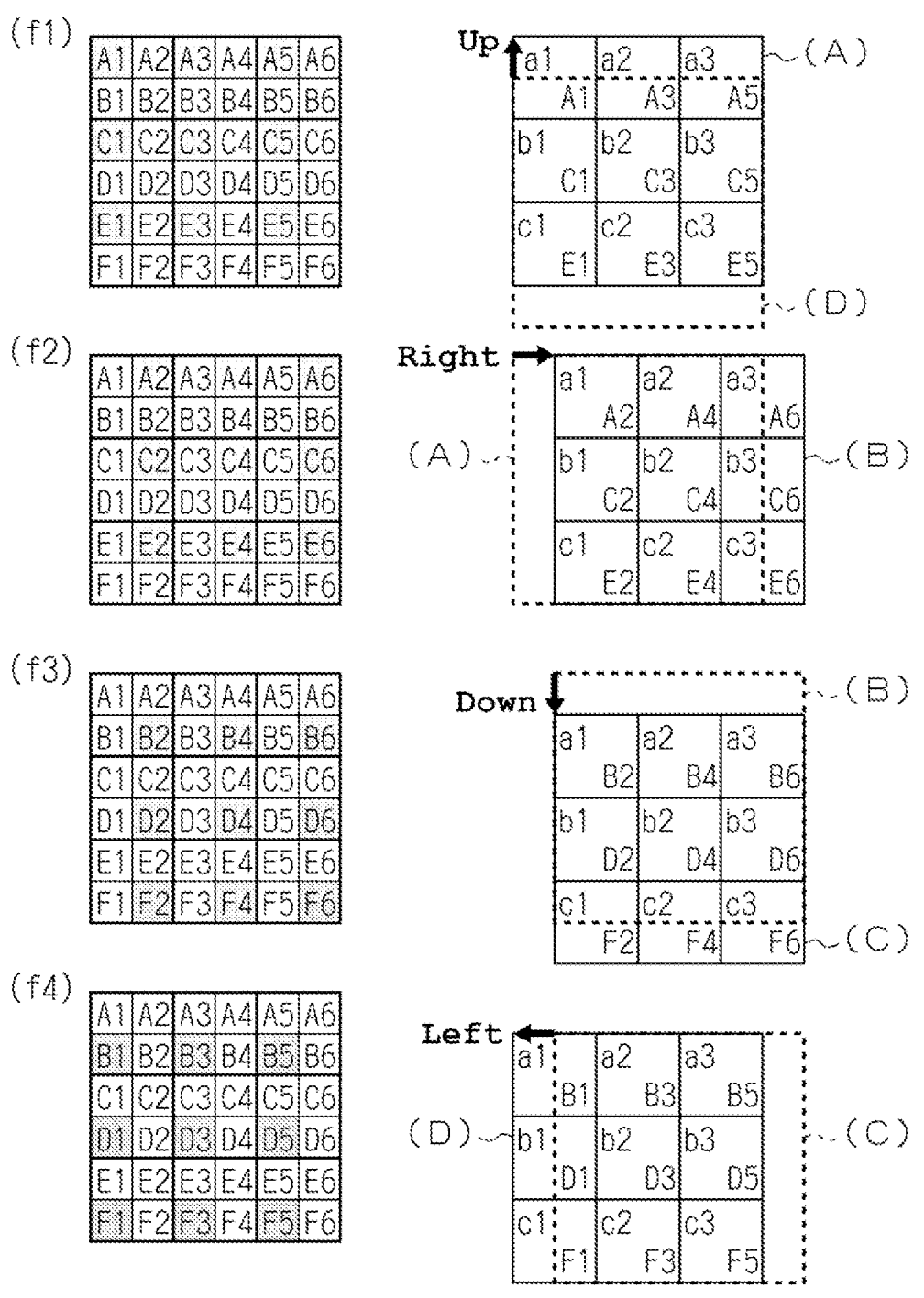

FIG. 5 is a diagram illustrating at which projection position in the liquid crystal projector 1, the panel pixel of the liquid crystal panel 100 displays the display pixel indicated by the video data Vid-in. Specifically, FIG. 5 is a diagram illustrating, in the subframes f1 to f4, which display pixel of the display pixels of FIG. 4 is displayed at which projection position by nine panel pixels of FIG. 4. The first stage in FIG. 5 illustrates that, in the subframe f1, for example, the panel pixel a1 displays information corresponding to the display pixel A1 and projects the information to a first projection position. The second stage in FIG. 5 illustrates that, in the subsequent subframe f2, for example, the panel pixel a1 displays information corresponding to the display pixel A2 and projects the information to a second projection position. The third stage in FIG. 5 illustrates that, in the subsequent subframe f3, for example, the panel pixel a1 displays information corresponding to the display pixel B2 and projects the information to a third projection position. The fourth stage in FIG. 5 illustrates that, in the subsequent subframe f4, for example, the panel pixel a1 displays information corresponding to the display pixel B1 and projects the information to a fourth projection position. Thereby, a high-resolution image based on the display pixels A1, A2, B2, and B1 can be displayed in one frame by using the panel pixel a1. In the present embodiment, the display pixel A1, the display pixel A2, the display pixel B2, and the display pixel B1 correspond to a first display pixel, a second display pixel, a third display pixel, and a fourth display pixel, respectively. Further, the subframe f1, the subframe f2, the subframe f3, and the subframe f4 correspond to a first period, a second period, a third period, and a fourth period, respectively. Further, the first projection position, the second projection position, the third projection position, and the fourth projection position are the projection positions corresponding to a first position, a second position, a third position, and a fourth position of the emission optical path of the synthesized image, respectively.

For convenience, the reference for explaining the projection position by the optical shift element 230 is the projection position (A) in the subframe f1 of the frame F.

Specifically, in the subframe f1, the panel pixels a1 to a3, b1 to b3, and c1 to c3 display the display pixels A1, A3, A5, C1, C3, C5, E1, E3, and E5 in order.

Here, for example, the panel pixel a1 expresses the display pixel A1 means that the panel pixel a1 of the liquid crystal panel 100R has a transmittance corresponding to the gray scale level of the R component in the display pixel A1 indicated by the video data Vid-in, the panel pixel a1 of the liquid crystal panel 100G has a transmittance corresponding to the gray scale level of the G component in the display pixel A1 indicated by the video data Vid-in, and the panel pixel a1 of the liquid crystal panel 100B has a transmittance corresponding to the gray scale level of the B component in the display pixel A1 indicated by the video data Vid-in.

In the subsequent subframe f2, the optical shift element 230 sets the projection position to the projection position (B) that is shifted to the right (Right) direction in the figure by 0.5 pixel by the panel pixel from the projection position (A) in the subframe f1 illustrated by a dashed line. Further, in the subframe f2, the panel pixels a1 to a3, b1 to b3, and c1 to c3 display the display pixels A2, A4, A6, C2, C4, C6, E2, E4, and E6 in order.

In the subframe f3, the optical shift element 230 sets the projection position to the projection position (C) that is shifted to the downward (Down) direction in the figure by 0.5 pixel by the panel pixel from the projection position (B) of the subframe f2 illustrated by the dashed line. Further, in the subframe f3, the panel pixels a1 to a3, b1 to b3, and c1 to c3 display the display pixels B2, B4, B6, D2, D4, D6, F2, F4, and F6 in order.

Then, in the subframe f4, the optical shift element 230 sets the projection position to the projection position (D) that is shifted to the left (Left) direction in the figure by 0.5 pixel by the panel pixel from the projection position (C) of the subframe f3 illustrated by the dashed line. Further, in the subframe f4, the panel pixels a1 to a3, b1 to b3, and c1 to c3 display the display pixels B1, B3, B5, D1, D3, D5, F1, F3, and F5 in order.

After the subframe f4, the optical shift element 230 shifts the projection position from the projection position (D) of the subframe f4 illustrated by the dashed line to the upward (UP) direction in the figure by 0.5 pixel by the panel pixel, and returns to the projection position (A) in the subframe f1.

Returning to FIG. 2 again, the display control circuit 21 generates a control signal Ctr for controlling the scanning of the liquid crystal panels 100R, 100G, and 100B for each subframe. The display control circuit 21 outputs a control signal Lac for controlling the projection position by the optical shift element 230 for each subframe.

The display control circuit 21 reflects the temperature detected by the sensor 240 upon the output of the control signal Lac as described later. The control signal Lac includes a control signal Lac_Y that shifts the projection position in the up-down direction, and a control signal Lac_X that shifts the projection position in the left-right direction, on the screen Scr. Specifically, among the projection positions by the optical shift element 230, the up-down direction is specified by the voltage of the control signal Lac_Y, and the left-right direction is specified by the voltage of the control signal Lac_X.

More specifically, the optical shift element 230 sets the projection position to the projection position (A) or (B) when the voltage of the control signal Lac_Y is the highest value, and sets the projection position to the projection position (C) or (D) when the voltage of the control signal Lac_Y is the lowest value. When the voltage of the control signal Lac_Y is from the highest value to the lowest value, the optical shift element 230 sets the projection position between the projection position (A) or (B) and the projection position (C) or (D) according to the voltage.

That is, the projection position in the up-down direction on the projection surface is fixed without moving when the voltage of the control signal Lac_Y is constant, and is shifted at a velocity corresponding to the inclination of the voltage change when the voltage of the control signal Lac_Y changes.

Further, the optical shift element 230 sets the projection position to the projection position (A) or (D) when the voltage of the control signal Lac_X is the highest value, and sets the projection position to the projection position (B) or (C) when the voltage of the control signal Lac_X is the lowest value. When the voltage of the control signal Lac_X is from the highest value to the lowest value, the optical shift element 230 sets the projection position between the projection position (A) or (D) and the projection position (B) or (C) according to the voltage.

That is, the projection position in the left-right direction on the projection surface is fixed without moving when the voltage of the control signal Lac_X is constant, and is shifted at a velocity corresponding to the inclination of the voltage change when the voltage of the control signal Lac_X changes.

The video processing circuit 22 temporarily stores the video data Vid-in, reads the video data corresponding to the pixel to be displayed in the subframe among the stored video data Vid-in, converts the read video data into an analog signal, and outputs the analog signal as data signals Vid-R, Vid-G and Vid-B. Of these, the data signal Vid-R is a signal obtained by converting the R component of the video data Vid-in, and is supplied to the liquid crystal panel 100R. Similarly, the data signal Vid-G is a signal obtained by converting the G component of the video data Vid-in, and is supplied to the liquid crystal panel 100G. The data signal Vid-B is a signal obtained by converting the B component of the video data Vid-in, and is supplied to the liquid crystal panel 100B.

Next, the liquid crystal panels 100R, 100G, and 100G will be generally described without specifying the color.

Figure 6:
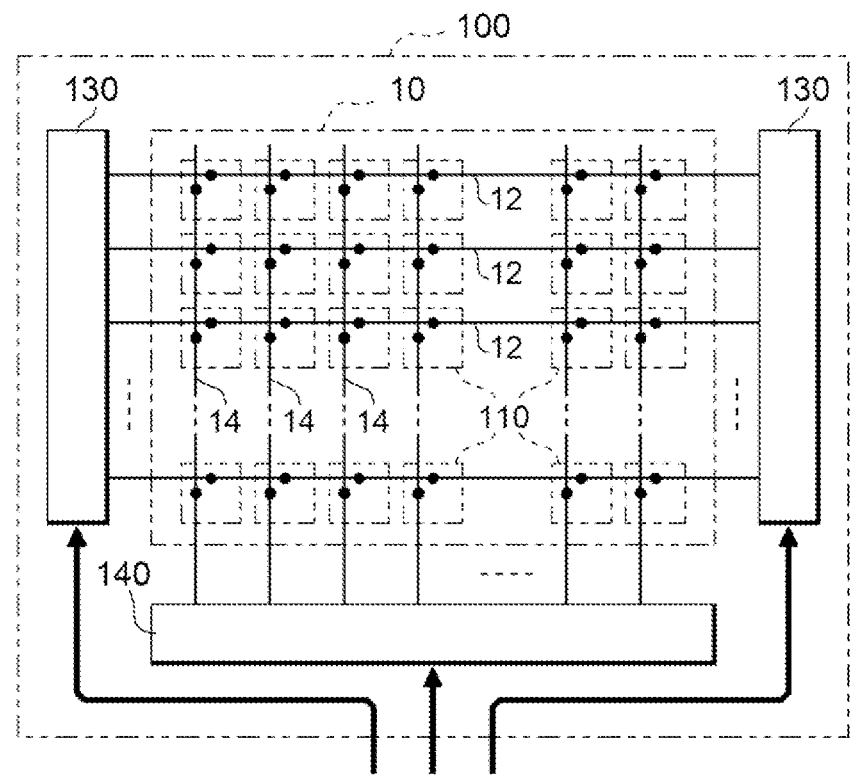
FIG. 6 is a diagram illustrating a configuration of a liquid crystal panel.

FIG. 6 is a block diagram illustrating an electrical configuration of the liquid crystal panel 100. The liquid crystal panel 100 is provided with a scanning line drive circuit 130 and a data line drive circuit 140 at the periphery of a display region 10.

In the display region 10 of the liquid crystal panel 100, pixel circuits 110 are arranged in a matrix. Specifically, in the display region 10, a plurality of scanning lines 12 are provided so as to extend in the horizontal direction in the figure, and a plurality of data lines 14 are provided so as to extend in the vertical direction in the figure while mutually maintaining electrical insulation with the scanning lines 12. Then, the pixel circuits 110 are provided in a matrix in correspondence with the intersection of the plurality of scanning lines 12 and the plurality of data lines 14.

When the number of scanning lines 12 is m and the number of data lines 14 is n, the pixel circuits 110 are arranged in a matrix of vertical m rows and horizontal n columns. Both m and n are integers equal to or greater than 2. In the scanning lines 12 and the pixel circuits 110, in order to distinguish the rows of the matrix from each other, the rows may be referred as 1, 2, 3, □, and m row in order from the top in the figure. Similarly, in the data lines 14 and the pixel circuits 110, in order to distinguish the columns of the matrix from each other, the columns may be referred as 1, 2, 3, □, and n column in order from the left in the figure.

In accordance with the control by the display control circuit 21, the scanning line drive circuit 130 selects the scanning line 12 one by one in order of, for example, 1, 2, 3, . . . , m-th row, and sets a scanning signal to the selected scanning line 12 to the H level. The scanning line drive circuit 130 sets the scanning signal to the scanning lines 12 other than the selected scanning line 12 to the L level.

The data line drive circuit 140 latches the data signal supplied from the video processing circuit 22 for one row in accordance with the control by the display control circuit 21, and in a period in which the scanning signal to the scanning line 12 is at the H level, the data line drive circuit 140 outputs the data signal, via the data line 14, to the pixel circuit 110 located at the scanning line 12.

Figure 7:
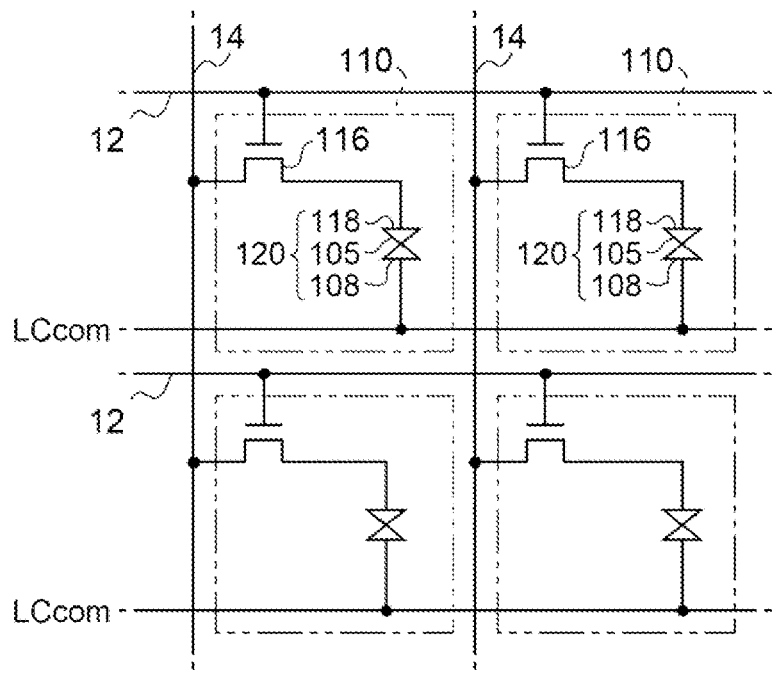
FIG. 7 is a diagram illustrating a configuration of a pixel circuit in the liquid crystal panel.

FIG. 7 is a diagram illustrating an equivalent circuit of the pixel circuit 110, which is a total of four of two rows and two columns, corresponding to intersections between two adjacent scanning lines 12 and two adjacent data lines 14.

As illustrated in the figure, the pixel circuit 110 includes a transistor 116 and a liquid crystal element 120. The transistor 116 is, for example, an n-channel type thin film transistor. In the pixel circuit 110, the gate node of the transistor 116 is coupled to the scanning line 12, while the source node thereof is coupled to the data line 14, and the drain node thereof is coupled to the pixel electrode 118 that is substantially square in plan view.

The common electrode 108 is commonly provided to all pixel circuits 110 so as to face the pixel electrode 118. A voltage LCcom is applied to the common electrode 108. Then, the liquid crystal 105 is sandwiched between the pixel electrode 118 and the common electrode 108. Therefore, the liquid crystal element 120 in which the liquid crystal 105 is sandwiched by the pixel electrode 118 and the common electrode 108 is configured for each pixel circuit 110.

A storage capacitor may be provided in parallel with the liquid crystal element 120, but this is not critical in the present case and is therefore omitted.

In the scanning line 12 in which the scanning signal reaches the H level, the transistor 116 of the pixel circuit 110 provided so as to correspond to the scanning line 12 is turned on. When the transistor 116 is turned on, the data line 14 and the pixel electrode 118 are in an electrically coupled state, so that the data signal supplied to the data line 14 reaches the pixel electrode 118 via the turned-on transistor 116. The scanning line 12 falls to L level, then the transistor 116 is turned off, and the voltage of the data signal having reached the pixel electrode 118 is retained by the capacitance of the liquid crystal element 120.

As is well known, in the liquid crystal element 120, the alignment state of the liquid crystal molecules varies in accordance with the electric field generated by the pixel electrode 118 and the common electrode 108. Accordingly, the liquid crystal element 120 has a transmittance according to an effective value of the applied voltage. Note that in the present embodiment, the liquid crystal element 120 is the normally black mode in which the transmittance increases as the applied voltage increases.

The operation of supplying the data signal to the pixel electrode 118 of the liquid crystal element 120 is executed in the order of 1, 2, 3, . . . , and m-th row in the period of one subframe, so that the voltage corresponding to the data signal is retained in each of the liquid crystal elements 120 of the pixel circuit 110 arranged in m rows n columns. By retaining such a voltage, each liquid crystal element 120 has a desired transmittance, and the liquid crystal elements 120 arranged in m rows n columns generate the modulated image of the corresponding color.

Figure 8:
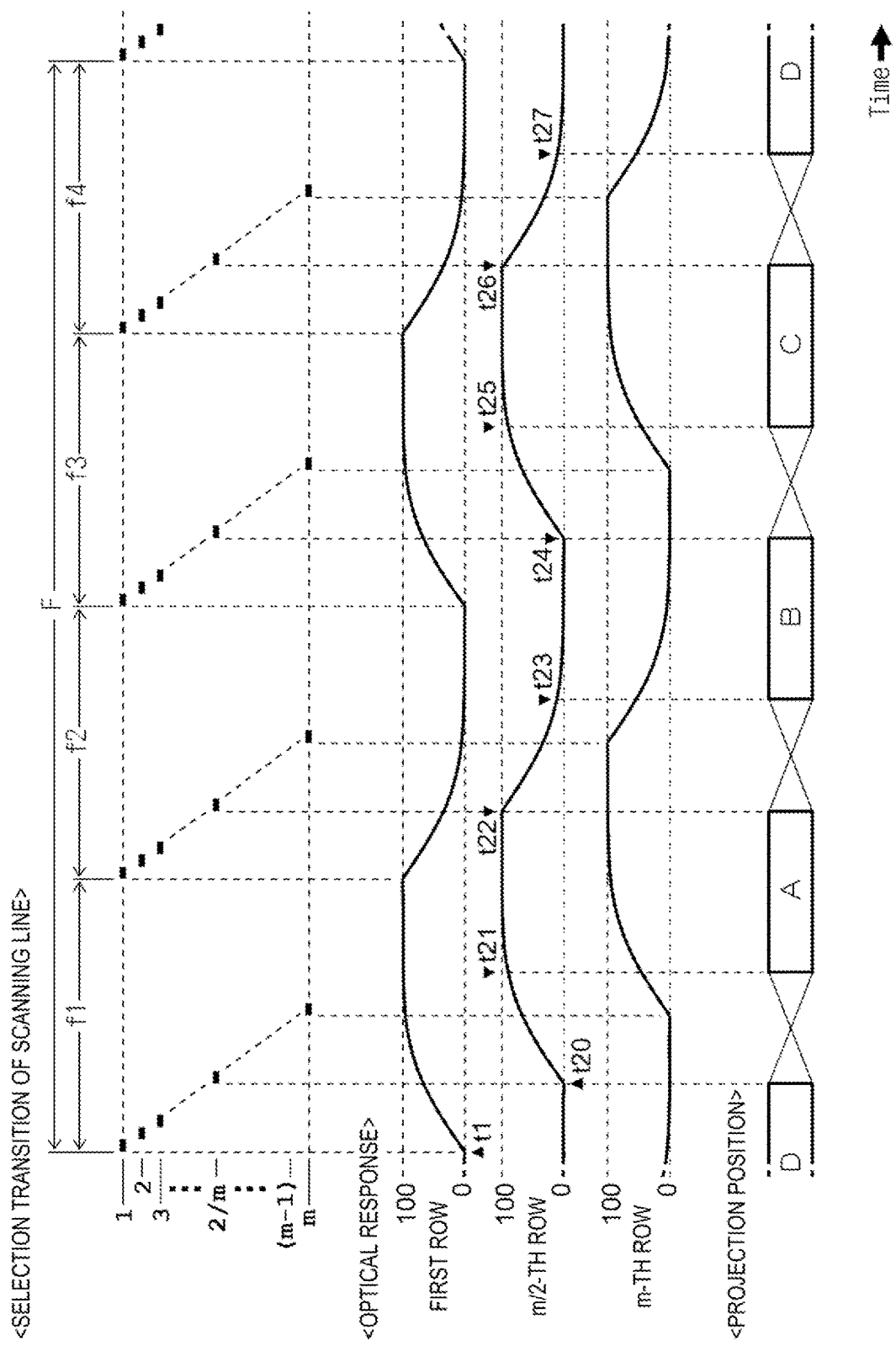
FIG. 8 is a diagram illustrating selection transition of a scanning line in the liquid crystal panel.

FIG. 8 is a diagram illustrating an example of the relationship between the selection transition of the scanning line 12, the optical response of the liquid crystal element 120, and the projection position by the optical shift element 230.

Note that in the selection transition of the scanning line 12 in FIG. 8, how the selected scanning line 12 transits in time when from the first row to the m-th row of the scanning line 12 is taken as the vertical axis and the elapsed time is taken as the horizontal axis is illustrated. When a state in which the scanning line 12 is selected is indicated by a thick black line, the scanning line 12 is exclusively selected one by one in each period of the subframes f1 to f4. The order of the selections is 1, 2, 3, □, and m-th row as described above.

When one scanning line 12 is selected in one subframe, the following data signal is supplied to one data line 14. Specifically, the data signal obtained by converting, the video data Vid-in of the display pixel at the position corresponding to the subframe among the four display pixels corresponding to the panel pixel, into analog is supplied to one data line 14.

In order to simplify the description here, the optical response of the liquid crystal element 120 in a case in which all the panel pixels are applied with data signals corresponding to the highest gray scale level in the subframes f1 and f3, and are applied with data signals corresponding to the lowest gray scale level in the subframes f2 and f4, will be described. Here, the optical response of the liquid crystal element 120 located in the first row, the m-th row, and the middle (m/2) row is illustrated as a representative.

As is well known, the optical response of the liquid crystal element 120, that is, the change characteristic of the transmittance with respect to the applied voltage of the liquid crystal element 120, changes slowly with a time delay. For example, in FIG. 8, the transmittance of the liquid crystal element 120 located at the scanning line 12 of the first row does not immediately reach 100% even when the data signal corresponding to the highest gray scale level is applied to the pixel electrode 118 of the liquid crystal element 120 at a timing t1 where the first scanning line 12 reaches the H level, but gradually increases like an integrated waveform with a time delay. The applied voltage of the liquid crystal element 120 is a difference between the voltage applied to the pixel electrode 118 and the voltage applied to the common electrode 108.

As illustrated, the timing at which the voltage of the data signal is applied to the pixel electrode 118 of the liquid crystal element 120 is earlier as the row of the scanning line 12 corresponding to the liquid crystal element 120 is smaller, and is later as the row is greater. Since scanning is performed from the first row to the m-th row, even when all the panel pixels are rewritten to the same transmittance, a situation in which the transmittance differs in each row occurs. In this case, the transmittance of the projection pixel to be visually recognized by the user at the projection position corresponding to each subframe is 0% or 100%.

Therefore, the optical shift element 230 is, for example, controlled so as to set the projection position to the projection position of the subframe during a period in which the actual transmittance in the middle (m/2) row is close to the desired value, and in other periods, is controlled so as to move the projection position. Specifically, for example, when the data signal corresponding to the highest gray scale level is applied in the subframe f1, the optical shift element 230 is fixed to the projection position (A) in the period from the timings t21 to t22 in which the transmittance of the liquid crystal element 120 in the (m/2) th row becomes a value that can be taken as the desired 100%. Note that t22 is the timing at which the scanning line 12 on the (m/2) th row reaches the H level in the next subframe f2, that is, the timing at the end of the period in which the transmittance maintains the desired 100%.

Similarly, for example, when the data signal corresponding to the lowest gray scale level is applied in the subframe f2, the optical shift element 230 is fixed to the projection position (B) in the period from the timings t23 to t24 in which the transmittance of the liquid crystal element 120 in the (m/2) th row becomes a value that can be taken as the desired 0%. Note that t24 is the timing at which the scanning line 12 on the (m/2) th row reaches the H level in the subframe f3, that is, the timing at the end of the period in which the transmittance maintains the desired 0%.

Further, the optical shift element 230 is fixed at the projection position (C) of the subframe in the period from the timings t25 to t26. Further, the optical shift element 230 is fixed at the projection position (D) in the period from the timings t27 to t26 of the next frame.

Note that, from the timings t22 to t23, the optical shift element 230 is controlled so as to shift from the projection position (A) to the projection position (B). Similarly, the optical shift element 230 is controlled so as to shift from the projection position (B) to the projection position (C) from the timings t24 to t25, is controlled so as to shift from the projection position (C) to the projection position (D) from the timings t26 to t27, and is controlled so as to shift from the projection position (D) to the projection position (A) from the timings t20 to the timing t21.

Figure 9:
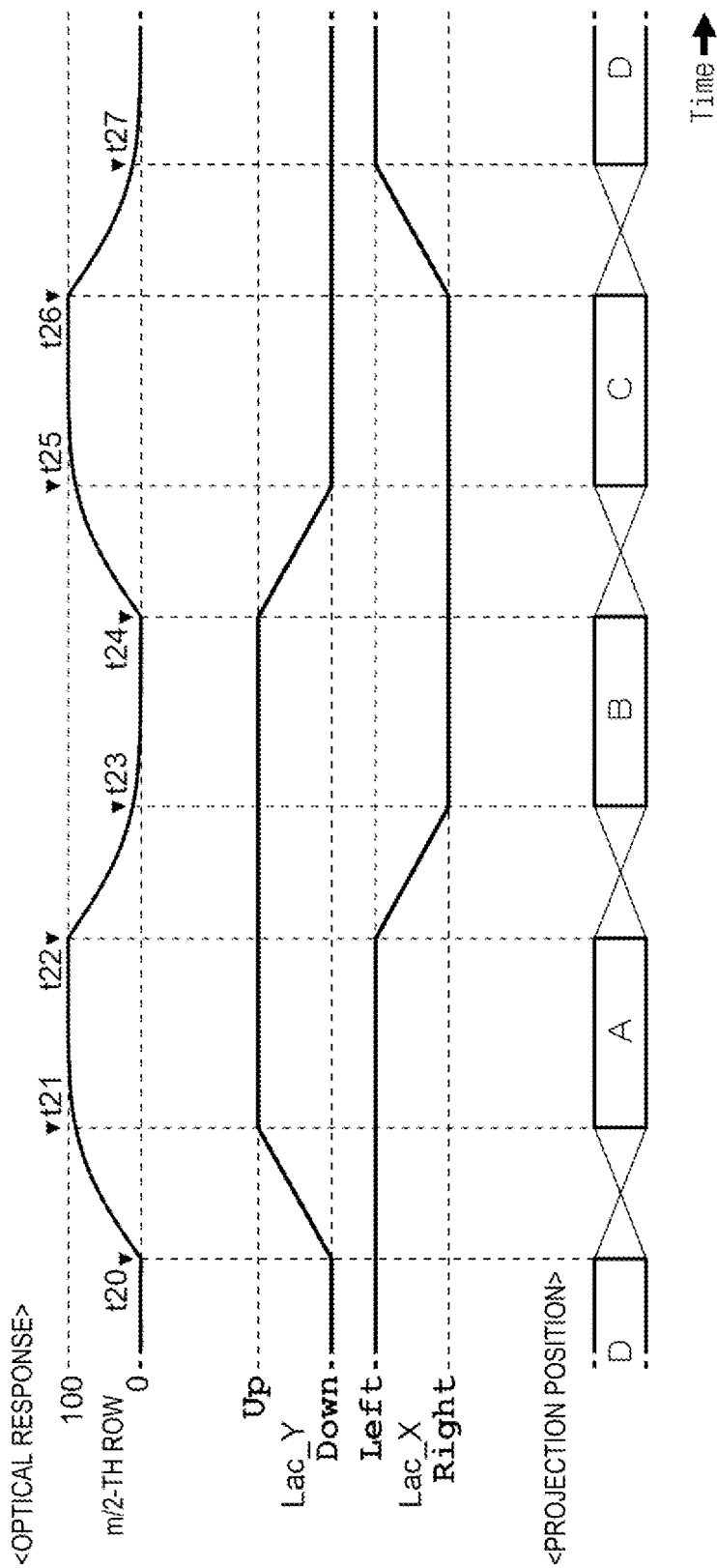
FIG. 9 is an explanatory diagram of an optical response of a liquid crystal element and shift operation by an optical shift element.

FIG. 9 illustrates the relationship between the projection position by the optical shift element 230 and the control signals Lac_Y and Lac_X.

Specifically, the voltage of the control signal Lac_Y increases from the lowest value to the highest value in the period from the timings t20 to t21, maintains the highest value until the timing t24, decreases from the highest value to the lowest value in the period from the timings t24 to t25, and maintains the lowest value until the timing t20 of the next frame.

Further, the voltage of the control signal Lac_X decreases from the highest value to the lowest value in the period from the timings t22 to t23, maintains the lowest value until the timing t26, increases from the lowest value to the highest value in the period from the timings t26 to t27, and maintains the highest value until the timing t22 of the next frame.

Note that when controlling the projection position of the optical shift element 230 so that the transmittance of the liquid crystal element 120 in the middle (m/2) row becomes the desired value, the projection position is fixed in a state in which the other rows, in particular, the first row and m-th row have the transmittance deviating from the desired value, but since they are separated from the center of the display region 10, and therefore, are less likely to be visually recognized as a decrease in display quality.

By the way, in the liquid crystal projector 1, light of extremely high luminous flux is incident on the liquid crystal panels 100R, 100G and 100B as compared with a direct viewing panel, so that the temperature change is significant. Specifically, in the liquid crystal element 120, as the temperature increases, the optical response to the electrical change becomes faster.

Therefore, when the optical response of the liquid crystal element 120 does not follow the shift operation of the optical shifting element 230, the projection pixel that has not reached the desired transmittance will be visually recognized at a predetermined projection position, so that the effect of artificially increasing the resolution is reduced.

Therefore, in the present embodiment, the temperature of the liquid crystal panel 100G is detected by the sensor 240, and the shift operation by the optical shift element 230 is controlled based on the detected temperature. Specifically, the shift operation is controlled such that the higher the temperature, the longer the time for fixing the projection position and the shorter the time for shifting the projection position.

In the present embodiment, the reason why the sensor 240 detects the temperature of the liquid crystal panel 100G on which the light of G is incident is that the visibility of green is generally higher than that of red and blue. Specifically, because if the modulated image by the liquid crystal panel 100G is not visually recognized at the desired projection position, the infection thereof becomes large and the display quality is likely to be deteriorated. Although the number of sensor 240 increases, the sensor 240 may be provided on the liquid crystal panel 100R or/and the liquid crystal panel 100B.

Figure 10:
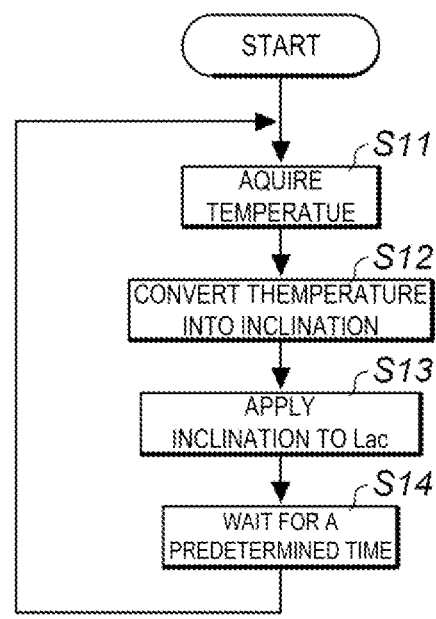
FIG. 10 is a flowchart illustrating a setting process of the optical shift element.

FIG. 10 is a flowchart illustrating a setting process of a fixing period and a shifting period of the projection position in controlling the optical shift element 230.

First, the display control circuit 21 acquires the temperature of the liquid crystal panel 100G from the detection signal Ts by the sensor 240 (step S11). For example, if the sensor 240 is a resistance element, the resistance value changes according to the temperature, so that the display control circuit 21 converts the resistance value indicated by the detection signal Ts to acquire the temperature of the liquid crystal panel 100G.

Next, the display control circuit 21 acquires the inclination of the control signal Lac corresponding to the acquired temperature (step S12). For example, the display control circuit 21 has a lookup table that stores the relationship between the temperature and the magnitude of the inclination in advance, and converts the acquired temperature into the magnitude of the inclination with reference to the lookup table. In the lookup table, the temperature is stored as a first value, a second value, or the like, and for example, the second value corresponds to a temperature higher than the first value.

The display control circuit 21 applies the acquired magnitude of the inclination to the control signals Lac_X and Lac_X (step S13). Specifically, the display control circuit 21 changes four of the inclination when the control signal Lac_Y rises at the timing t20, the inclination when the control signal Lac_X falls at the timing t24, the inclination when the control signal Lac_X falls at the timing t22, and the inclination when the control signal Lac_X rises at the timing t26, to the magnitude of the inclination acquired in step S12.

Then, after changing the magnitude of the inclination, the display control circuit 21 waits for a predetermined time, for example, for 5 minutes, in this setting process (step S14).

After waiting, the display control circuit 21 returns the processing procedure to step S11. Accordingly, the setting process in steps S11 to S14 is performed repeatedly for each of the predetermined intervals.

Figure 11:
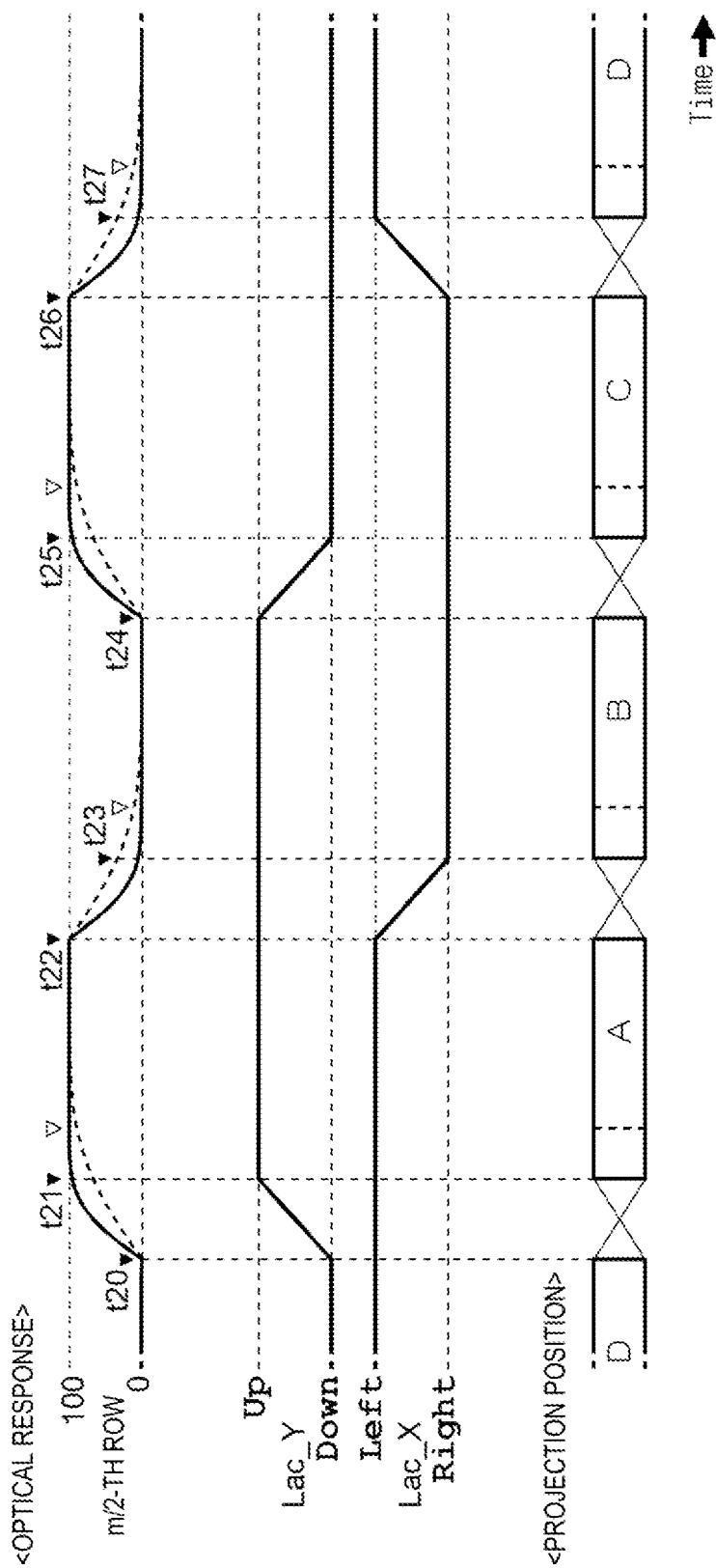
FIG. 11 is an explanatory diagram of the optical response of the liquid crystal element and the shift operation by the optical shift element.

As illustrated in FIG. 11, when the temperature of the liquid crystal panel 100G increases, the optical response of the liquid crystal element 120 becomes faster from the timings t20, t22, t24, and t26 as start points. Note that a dashed line in the optical response of FIG. 11 illustrates the optical response in FIG. 9, that is, the optical response when the temperature is relatively low.

According to the present embodiment, when the temperature of the liquid crystal panel 100G increases, the shifting period starting from the timings t20, t22, t24, and t26 becomes shorter, and correspondingly, a period in which the projection position is fixed to the projection positions (A), (B), (C), and (D) is secured for a long period. Note that a dashed line at the projection position in FIG. 11 illustrates the projection position in FIG. 9, that is, the projection position when the temperature is low.

Further, when the temperature of the liquid crystal panel 100G is relatively low, for example, such as immediately after the power is turned on, the shifting period starting from the timings t20, t22, t24, and t26 becomes long, so that the projection position is prevented from being fixed at the projection positions (A), (B), (C), and (D) in a state where the desired transmittance is not achieved.

As described above, according to the present embodiment, the fixing period and the shifting period of the projection position are controlled according to the temperature of the liquid crystal panel 100G, so that the deterioration of the display quality can be suppressed.

Further, in the present embodiment, since the shifting period is a period in which the transmittance of the liquid crystal element 120 changes to the desired value, and therefore, there is no decrease in brightness as compared to a configuration in which a dedicated image for movement is inserted, and the configuration in which the dedicated image for the movement is inserted is not necessary.

The liquid crystal projector 1 according to the embodiment is not limited to the embodiment, and various modifications described below are possible. Further, the exemplary embodiment or each modified example may be appropriately combined.

Although the embodiment is described by using the normally black mode, a normally white mode may be used. Further, the liquid crystal panels 100R, 100G, and 100B are transmission-type, but may also be reflection-type. When the liquid crystal panels 100R, 100G, and 100B are the reflection-type, the transmittance may be read as the reflectance.

The liquid crystal projector 1 is the three-plate type including liquid crystal panels 100R, 100G, and 100B, but for example, Y (yellow) may be added between G and R to form a four-plate type to improve color reproducibility. Further, it can also be applied to a single plate type that displays a monochrome image with only shades instead of a color image.

The sensor 240 may not be separated from the liquid crystal panel 100G, but may be a built-in type in which a detection wiring is formed in the liquid crystal panel 100G and the resistance of the detection wiring changes depending on the temperature. Further, as the sensor 240, a sensor separate from the liquid crystal panel 100G may be used in contact with the liquid crystal panel 100G, or the temperature of a portion that has high correlation with the temperature in the display region 10 may be detected in non-contact with the liquid crystal panel 100G. Further, the sensor 240 may be a cell gap sensor, a strain sensor, or the like, as long as it detects usage conditions that affect the liquid crystal response.

In the embodiment, the optical shift element 230 is configured to shift to the projection surface in two axes in the up-down direction and the left-right direction, but may be configured to shift, for example, in one axis in the up-down direction, the left-right direction, or an oblique direction.

From the embodiment and modifications (hereinafter, referred to as embodiments and the like) described above, for example, the following aspects can be grasped.

A liquid crystal projector according to one aspect (first aspect) includes a liquid crystal panel configured to generate a modulated image, a sensor configured to detect a temperature of the liquid crystal panel, an optical shift element configured to shift an emission optical path of the modulated image generated by the liquid crystal panel, and a control circuit configured to control a velocity of a shift in the optical shift element according to the temperature detected by the sensor.

According to this aspect, even if the optical response of the liquid crystal panel changes due to temperature, the velocity of the shift by the optical shift element changes in accordance with the detected temperature, and thus it is possible to prevent a decrease in display quality due to the transmittance or reflectance different from the desired value from being visually recognized at the projection position.

In a specific aspect (second aspect) of the first aspect, when the temperature detected by the sensor is a second value higher than a first value, the control circuit shifts the emission optical path in the optical shift element at a velocity higher than a velocity in a case of the first value.

According to this aspect, when the temperature increases and the optical response becomes faster, the velocity of the shift is also increased in accordance with the optical response.

The liquid crystal projector according to another aspect (third aspect) includes a first liquid crystal panel configured to generate a first modulated image of first color light, a second liquid crystal panel configured to generate a second modulated image of second color light having a wavelength shorter than that of the first color light, a third liquid crystal panel configured to generate a third modulated image of third color light having a wavelength shorter than that of the second color light, a synthesizing unit configured to synthesize the first modulated image, the second modulated image, and the third modulated image, an optical shift element configured to shift an emission optical path of a synthesized image by the synthesizing unit, a sensor configured to detect a temperature of the second liquid crystal panel, and a control circuit configured to control a velocity of a shift in the optical shift element according to the temperature detected by the sensor.

According to this aspect, in the liquid crystal projector that projects the color image, it is possible to prevent a decrease in display quality due to the transmittance or reflectance different from the desired value from being visually recognized at the projection position. Note that the red color light is an example of the first color light, the green color light is an example of the second color light, and the blue color light is an example of the third color light. Further, the liquid crystal panel 100R is an example of the first liquid crystal panel, the liquid crystal panel 100G is an example of the second liquid crystal panel, and the liquid crystal panel 100B is an example of the third liquid crystal panel.

Further, the liquid crystal projector according to another aspect (fourth aspect) includes a first liquid crystal panel configured to generate a first modulated image of first color light, a second liquid crystal panel configured to generate a second modulated image of second color light having a wavelength shorter than that of the first color light, a third liquid crystal panel configured to generate a third modulated image of third color light having a wavelength shorter than that of the second color light, a synthesizing unit configured to synthesize the first modulated image, the second modulated image, and the third modulated image, an optical shift element configured to shift an emission optical path of a synthesized image by the synthesizing unit, a sensor configured to detect a temperature of the second liquid crystal panel, and a control circuit configured to control the first liquid crystal panel, the second liquid crystal panel, the third liquid crystal panel, and the optical shift element, wherein the control circuit is configured to shift the emission optical path to a first position in a first period and to shift the emission optical path to a second position in a second period after the first period, and in the first period, the control circuit is configured to cause one panel pixel in the first liquid crystal panel, the second liquid crystal panel, and the third liquid crystal panel to have a gray scale level of the first color light, a gray scale level of the second color light, and a gray scale level of the third color light, in this order, among gray scale levels of a first display pixel specified by video data, and in the second period, the control circuit is configured to cause the one panel pixel in the first liquid crystal panel, the second liquid crystal panel, and the third liquid crystal panel to have a gray scale level of the first color light, a gray scale level of the second color light, and a gray scale level of the third color light, in this order, among gray scale levels of a second display pixel specified by the video data.

According to this aspect, in the liquid crystal projector that projects the color image, the decrease in display quality can be suppressed.

Note that, for example, the projection position (A) is an example of the first position, and the projection position (B) is an example of the second position. Further, the display pixel A1 is an example of the first display pixel, the display pixel A2 is an example of the second display pixel, and the panel pixel a1 is an example of one panel pixel.

A fifth aspect represents the liquid crystal projector according to the first aspect as a control method for the liquid crystal projector.

What is claimed is:
1. A liquid crystal projector comprising:
   a liquid crystal panel configured to emit a modulated image light,
   a sensor configured to detect a temperature of the liquid crystal panel,
   an optical path shift element configured to shift an emission optical path of the modulated image light emitted from the liquid crystal panel, and
   a control circuit configured to control a velocity of a movement of the emission of the optical path in the shift in the optical path shift element according to the temperature detected by the sensor,
   wherein when the temperature detected by the sensor is a second value higher than a first value, the control circuit shifts the emission optical path in the optical path shift element at a velocity higher than a velocity in a case of the first value.
2. A liquid crystal projector comprising:
   a first liquid crystal panel configured to emit a first modulated image light of first color light,
   a second liquid crystal panel configured to emit a second modulated image light of second color light having a wavelength shorter than that of the first color light,
   a third liquid crystal panel configured to emit a third modulated image light of third color light having a wavelength shorter than that of the second color light,
   a synthesizing unit configured to synthesize the first modulated image light, the second modulated image light, and the third modulated image light,
   an optical path shift element configured to shift an emission optical path of a synthesized image light emitted from the synthesizing unit,
   a sensor configured to detect a temperature of the second liquid crystal panel, and
   a control circuit configured to control a velocity of a shift in the optical path shift element according to the temperature detected by the sensor.

3. A liquid crystal projector comprising:
a first liquid crystal panel configured to emit a first modulated image light of first color light,
a second liquid crystal panel configured to emit a second modulated image light of second color light having a wavelength shorter than that of the first color light,
a third liquid crystal panel configured to emit a third modulated image light of third color light having a wavelength shorter than that of the second color light,
a synthesizing unit configured to synthesize the first modulated image light, the second modulated image light, and the third modulated image light,
an optical path shift element configured to shift an emission optical path of a synthesized image light emitted from the synthesizing unit,
a sensor configured to detect a temperature of the second liquid crystal panel, and
a control circuit configured to control the first liquid crystal panel, the second liquid crystal panel, the third liquid crystal panel, and the optical path shift element, wherein
the control circuit is configured to shift the emission optical path to a first position in a first period and to shift the emission optical path to a second position in a second period after the first period, and
in the first period, the control circuit is configured to cause one panel pixel in each of the first liquid crystal panel, the second liquid crystal panel, and the third liquid crystal panel to have a gray scale level of the first color light, a gray scale level of the second color light, and a gray scale level of the third color light, respectively, among gray scale levels of a first display pixel specified by video data, and
in the second period, the control circuit is configured to cause the one panel pixel in the first liquid crystal panel, the second liquid crystal panel, and the third liquid crystal panel to have a gray scale level of the first color light, a gray scale level of the second color light, and a gray scale level of the third color light, in this order, among gray scale levels of a second display pixel specified by the video data.

4. A method for controlling a liquid crystal projector, the liquid crystal projector comprising a liquid crystal panel and an optical path shift element, the method comprising:
causing the liquid crystal panel to emit a modulated image light, and
causing the optical path shift element to change a velocity of movement at which an emission optical path of the modulated image light emitted by the liquid crystal panel is shifted according to a temperature of the liquid crystal panel,
wherein when the temperature detected by a sensor is a second value higher than a first value, the control circuit shifts the emission optical path in the optical path shift element at a velocity higher than a velocity in a case of the first value.

* * * * *